(12) United States Patent
Muhamad et al.

(10) Patent No.: US 12,372,062 B2
(45) Date of Patent: Jul. 29, 2025

(54) GEARBOX SUPPORT ARRANGEMENT FOR A WIND TURBINE AND WIND TURBINE

(71) Applicant: Nordex Energy SE & Co. KG, Hamburg (DE)

(72) Inventors: Ibrahim Muhamad, Rostock (DE); Gerald Festner, Klein Krams (DE); Viktor Nickel, Hamburg (DE)

(73) Assignee: Nordex Energy SE & Co. KG, Hamburg (DE)

( * ) Notice: Subject to any disclaimer, the term of this patent is extended or adjusted under 35 U.S.C. 154(b) by 49 days.

(21) Appl. No.: 17/698,762

(22) Filed: Mar. 18, 2022

(65) Prior Publication Data

US 2022/0299012 A1 Sep. 22, 2022

(30) Foreign Application Priority Data

Mar. 18, 2021 (EP) .................................. 21163390

(51) Int. Cl.
*F03D 15/00* (2016.01)
*F03D 80/70* (2016.01)

(52) U.S. Cl.
CPC ............. *F03D 15/00* (2016.05); *F03D 80/70* (2016.05); *F05B 2240/50* (2013.01); *F05B 2260/4031* (2013.01)

(58) Field of Classification Search
CPC .......... F03D 15/00; F03D 80/70; F03D 15/10; F03D 80/88; F03D 80/881; F05B 2240/50;

(Continued)

(56) References Cited

U.S. PATENT DOCUMENTS 8,786,124 B2 * 7/2014 Castell ...................... F03D 9/25
290/55
9,856,966 B2 1/2018 Wilson
(Continued)

FOREIGN PATENT DOCUMENTS

DE 10 2018 008 034 A1 4/2020
EP 1 855 001 A1 11/2007
(Continued)

OTHER PUBLICATIONS

Extended search report of the European Patent Office dated Sep. 1, 2021 for European application 21163390.4 on which this application is based.

*Primary Examiner* — Mark A Laurenzi
*Assistant Examiner* — Kelsey L Stanek
(74) *Attorney, Agent, or Firm* — Walter Ottesen, P.A.

(57) ABSTRACT

A gearbox support arrangement for a wind turbine includes: a gearbox housing, a torque support arrangement, a rotor bearing support structure, wherein the gearbox housing and the rotor bearing support structure are arranged next to each other along a longitudinal axis, the torque support arrangement couples the gearbox housing and the rotor bearing support structure with each other such that torque loads are transmittable between the gearbox housing and the rotor bearing support structure. The torque support arrangement includes a decoupling device configured to transmit the torque loads between the gearbox housing and the rotor bearing support structure and to reduce the transmission of vibrations and reaction loads between the gearbox housing and the rotor bearing support structure.

12 Claims, 5 Drawing Sheets

(58) Field of Classification Search
CPC .......... F05B 2260/4031; F05B 2240/14; F05B 2260/30; F05B 2260/40311
USPC ................................................. 416/170 R
See application file for complete search history.

(56) References Cited

U.S. PATENT DOCUMENTS

| | | |
|---|---|---|
| 10,619,721 B2 | 4/2020 | Wilson |
| 2007/0265133 A1 | 11/2007 | Smook |
| 2011/0187122 A1 | 8/2011 | Martinez et al. |
| 2011/0210490 A1 | 9/2011 | Mitsch |
| 2012/0076652 A1 | 3/2012 | Ventzke et al. |
| 2019/0186467 A1* | 6/2019 | Eusterbarkey .......... F03D 15/00 |
| 2022/0003304 A1 | 1/2022 | Wuerr et al. |

FOREIGN PATENT DOCUMENTS

| | | | |
|---|---|---|---|
| EP | 2 172 647 A1 | 4/2010 | |
| EP | 2 352 930 B1 | 8/2011 | |
| EP | 2 434 154 A1 | 3/2012 | |
| EP | 2 593 673 B1 | 5/2013 | |
| EP | 2 732 157 B1 | 5/2014 | |
| EP | 3 012 479 A1 | 4/2016 | |
| EP | 3447282 A1 * | 2/2019 | ............. F03D 13/00 |
| WO | 2017/045688 A1 | 3/2017 | |
| WO | 2020/094309 A1 | 5/2020 | |

\* cited by examiner

GEARBOX SUPPORT ARRANGEMENT FOR A WIND TURBINE AND WIND TURBINE

CROSS REFERENCE TO RELATED APPLICATION

This application claims priority of European patent application no. 21163390.4, filed Mar. 18, 2021, the entire content of which is incorporated herein by reference.

TECHNICAL FIELD

The disclosure relates to a gearbox support arrangement for a wind turbine and a wind turbine including such a gearbox support arrangement.

BACKGROUND

A wind turbine may include a rotor that includes a rotatable rotor hub assembly having multiple rotor blades. The rotor blades transform wind energy into a drive torque that drives a generator via a drive train. The drive train may include a rotor shaft, a gearbox, a coupling, a rotor brake and other components. The generator, the gearbox and the other components may be mounted within a nacelle that is positioned on top of a tower.

SUMMARY

It is desirable to provide a gearbox support arrangement for a wind turbine and a wind turbine that enables reliable operation.

Embodiments of the disclosure provide a gearbox support arrangement for a wind turbine. The gearbox support arrangement can, for example, include:
  a gearbox housing,
  a torque support arrangement,
  a rotor bearing support structure, wherein
  the gearbox housing and the rotor bearing support structure are arranged next to each other along a longitudinal axis,
  the torque support arrangement couples the gearbox housing and the rotor bearing support structure with each other such that torque loads are transmittable between the gearbox housing and the rotor bearing support structure,
  the torque support arrangement includes a decoupling device configured to transmit the torque loads between the gearbox housing and the rotor bearing support structure and to reduce a transmission of vibrations and reaction loads between the gearbox housing and the rotor bearing support structure.

The gearbox support arrangement allows a reliable operation of the rotor bearing support structure and the gearbox housing.

The rotor bearing support structure is configured to accommodate one or several rotor bearings for rotatably supporting the rotor shaft. According to embodiments, the rotor bearing support structure is a rotor bearing housing fixed and supported by a base or a machine frame (also called machine support or base frame), wherein the base or machine support is rotatably mounted on top of a tower of the wind turbine. According to further embodiments, the rotor bearing support structure includes a first portion sized to receive the rotor shaft therethrough and a second portion which supports the first portion and which is configured to be rotatably mounted on top of a tower of the wind turbine, wherein the first and second portion are integrally formed with each other.

The gearbox housing is the housing of a gearbox which is configured to transform a torque (drive torque) and a rotation speed of the rotor shaft into a different torque (output torque) and a different rotation speed for the generator shaft of the wind turbine. The drive torque in the gearbox causes a counter torque in the gearbox housing. The gearbox housing therefore needs to be supported by a support structure in order for the gearbox to maintain its position.

The torque support arrangement enables a transmission of torque loads between the gearbox housing and the rotor bearing support structure. In particular, the torque support arrangement enables the transmission of a counter torque from the gearbox housing to the rotor bearing support structure. This counter torque from the gearbox housing results from the drive torque present in the gearbox. The counter torque from the gearbox housing is transmitted in the form of tangential forces to the torque support arrangement and the rotor bearing support structure. The rotor bearing support structure absorbs the counter torque transmitted from the gearbox housing via the torque support arrangement.

The torque support arrangement includes a decoupling device. For example, the decoupling device is arranged between the gearbox housing and the rotor bearing support structure. The decoupling device is configured to transmit torque loads between the gearbox housing and the rotor bearing support structure. Furthermore, the decoupling device is configured to reduce vibrations and reaction loads (that is, reaction forces and bending moments) which are for example caused by structural deformations and/or by manufacturing and assembly deviations of the components of the gearbox support arrangement. The decoupling device thus reduces the forwarding and transmission of the vibrations and reaction loads between the gearbox housing and the rotor bearing support structure. The gearbox housing and the rotor bearing support structure are decoupled from each other regarding the reaction loads, vibrations, shakings and/or tilting, while the transmission of the torque loads is still possible.

The torque support arrangement described herein prevents the need of torque support elements such as torque arms which vertically transmit the counter torque by directly coupling the gearbox housing to the base or machine frame of the nacelle. This enables more free space on the base or machine frame for yaw drives and/or for flanges to connect with a frame carrying electric components and/or for other components that need to be arranged inside the nacelle. Direct vertical support of the gearbox housing on the base or machine frame can be avoided. Thus, high bending moments and uneven load distribution on the base or machine frame can be avoided, which is particularly advantageous in case the base includes a plate screwed on a yaw bearing. In addition, a shorter tolerance chain is possible. Furthermore, the arrangement can be provided as a modular arrangement. For example, the rotor bearing support structure can be easily separated from the gearbox housing. This is, for example, convenient for transport and erection of the wind turbine. The weight of the gearbox can also have a relieving effect on the rotor bearing(s) in the case of a firm connection between the rotor shaft and the gearbox input shaft. Furthermore, reaction loads in the rotor bearing(s) and in the bearing(s) of the gearbox first stage which are caused by structural deformations and/or by manufacturing and assembly deviations can be reduced.

According to a further embodiment, the torque support arrangement includes a protrusion at one of the gearbox housing and the rotor bearing support structure. The protrusion protrudes along the radial direction with respect to the longitudinal axis. The torque support arrangement includes a flange at the other one of the rotor bearing support structure and the gearbox housing. In particular, the protrusion and the flange form functional parts of the torque support arrangement, while the protrusion is structurally an integral part of the rotor bearing support structure and the flange is structurally an integral part of the gearbox housing. Alternatively, the protrusion and the flange may be separate elements to be fixed to the rotor bearing support structure and/or to the gearbox housing respectively, for example via a screw connection.

The torque support arrangement includes a support frame with an opening into which the protrusion is insertable along the radial direction. The protrusion thus protrudes into the opening along the radial direction. The support frame is fixed to the flange along the axial direction. This enables an easy assembly of the gearbox support arrangement, as the fixing position of the support frame to the flange can be adapted to the specific dimensions of the respective components of the gearbox support arrangement.

For example, the gearbox housing includes the flange. The support frame is fixed to the flange and thus fixed to the gearbox housing. The rotor bearing support structure includes the radial protruding protrusion. The protrusion of the rotor bearing support structure protrudes into the opening of the frame of the gearbox housing. Alternatively or in addition, the rotor bearing support structure includes the flange. The support frame is fixed to the flange and thus fixed to the rotor bearing support structure. The gearbox housing includes the radial protruding protrusion. The protrusion of the gearbox housing protrudes into the support frame of the rotor bearing support structure. The torque support arrangement transmits the torque loads tangentially to the rotor bearing support structure. The torque loads are transmittable via the rotor bearing support structure to the tower of the wind turbine.

According to a further embodiment, the support frame completely surrounds the opening in a plane tangent to the gearbox housing and to the rotor bearing support structure. Thus, the support frame completely surrounds the opening in a tangent plane. In particular, the support frame is arranged at both sides of the protrusion along the longitudinal axis. The support frame enables a reliable and secure transmission of the torque loads from the gearbox housing to the rotor bearing support structure.

According to a further embodiment, the torque support arrangement includes a plurality of screws that fix the support frame to the flange. The screws are aligned along the axial direction. The screws reach through the support frame to the flange along the axial direction. This makes a reliable and space-saving coupling possible.

According to a further embodiment, the protrusion protrudes along the axial direction. The torque support arrangement includes two further protrusions at the other one of the rotor bearing support structure and the gearbox housing. The further protrusions limit the opening. The protrusion protrudes into the opening along the axial direction. The protrusion is insertable into the opening along the axial direction.

For example, the protrusion is arranged at the rotor bearing support structure and protrudes along the axial direction into the opening between the two further protrusions. The two further protrusions are arranged at the gearbox housing.

Alternatively or in addition, the gearbox housing includes the protrusion which axially protrudes in the opening between the two further protrusions, which are arranged at the rotor bearing support structure. The rotor bearing support structure as well as the gearbox housing each include at least one axially protruding protrusion. Thus, the number of parts and components can be reduced and a space-saving arrangement is possible.

The axially protruding protrusions of the rotor bearing support structure and of the gearbox housing may structurally be an integral part of the rotor bearing support structure and gearbox housing. Alternatively, the protrusions may be separate elements to be fixed to the rotor bearing support structure and/or to the gearbox housing, for example via a screw connection.

According to a further embodiment, the decoupling device includes two decoupling elements. The decoupling elements are tangentially arranged on opposite sides of the protrusion. Each decoupling element is arranged between the protrusion and a wall. The wall is arranged opposite the protrusion and limits the opening. For example, the wall is a wall of the support frame. For example, the wall is a wall of the further protrusions.

According to a further embodiment, the decoupling elements each include or consist of at least one spring damping element. These spring damping elements may have a hydraulic, elastomeric, elastomeric-hydraulic or plastic structure.

According to a further embodiment, the torque support arrangement includes a ring element. The ring element is formed separately from the gearbox housing and the rotor bearing support structure. According to embodiments, the ring element is connected to the gearbox housing and includes the protrusion. According to embodiments, the ring element is connected to the rotor bearing support structure and includes the two further protrusions.

According to a further embodiment, the ring element includes a plurality of ring segments. According to embodiments, the ring segments are radially removable from the gearbox housing. According to embodiments, the ring segments are radially removable from the rotor bearing support structure.

According to a further embodiment, the further protrusions are formed separately from the gearbox housing and the rotor bearing support structure. According to embodiments, the further protrusions are connected to the gearbox housing. According to embodiments, the further protrusions are connected to the rotor bearing support structure.

According to further embodiments, the gearbox support arrangement includes a plurality of torque support arrangements. For example, each torque support arrangement is configured according to an embodiment of the torque support arrangement described herein.

It is possible that all torque support arrangements are configured the same way. It is also possible that different embodiments of the torque support arrangement are combined in a gearbox support arrangement.

The torque support arrangements, for example, are symmetrically arranged. In some embodiments, a symmetrical arrangement means that the angular distance between each pair of adjacent torque support arrangements around the circumference of the gearbox housing and the rotor bearing support structure is identical. In some embodiments, a symmetrical arrangement means that the torque support arrangements are symmetrically arranged with respect to an axis aligned to the radial direction. The use of the plurality of torque support arrangements, for example two, three, four, five or more torque support arrangements allows a smaller and more compact configuration of each of the torque support arrangements. Furthermore, a more equal distribution of the torque transmission around the circumference of the gearbox housing and the rotor bearing support structure is possible.

According to a further embodiment, the gearbox support arrangement, in particular the torque support arrangement, includes:
- a protrusion of one of the rotor bearing support structure and the gearbox housing, the protrusion protruding either along an axial direction or a radial direction with respect to the longitudinal axis,
- an opening at the other one of the rotor bearing support structure and the gearbox housing, wherein the protrusion is arranged inside the opening at least in parts and wherein the torque support arrangement is configured such that the protrusion is inserted into the opening along the direction in which the protrusion protrudes.

Further embodiments of the disclosure provide a wind turbine. In particular, the wind turbine includes a nacelle. The wind turbine includes a gearbox support arrangement according to at least one of the described embodiments. The wind turbine can have a compact configuration and in particular there is no need to have a larger nacelle even when wind turbines are getting bigger due to the space-saving that is made possible by the torque support arrangement.

BRIEF DESCRIPTION OF THE DRAWINGS

The invention will now be described with reference to the drawings wherein.

DESCRIPTION OF THE PREFERRED EMBODIMENTS

Throughout the drawings, identical components and components of the same type and effect may be represented by the same reference signs.

Figure 1:
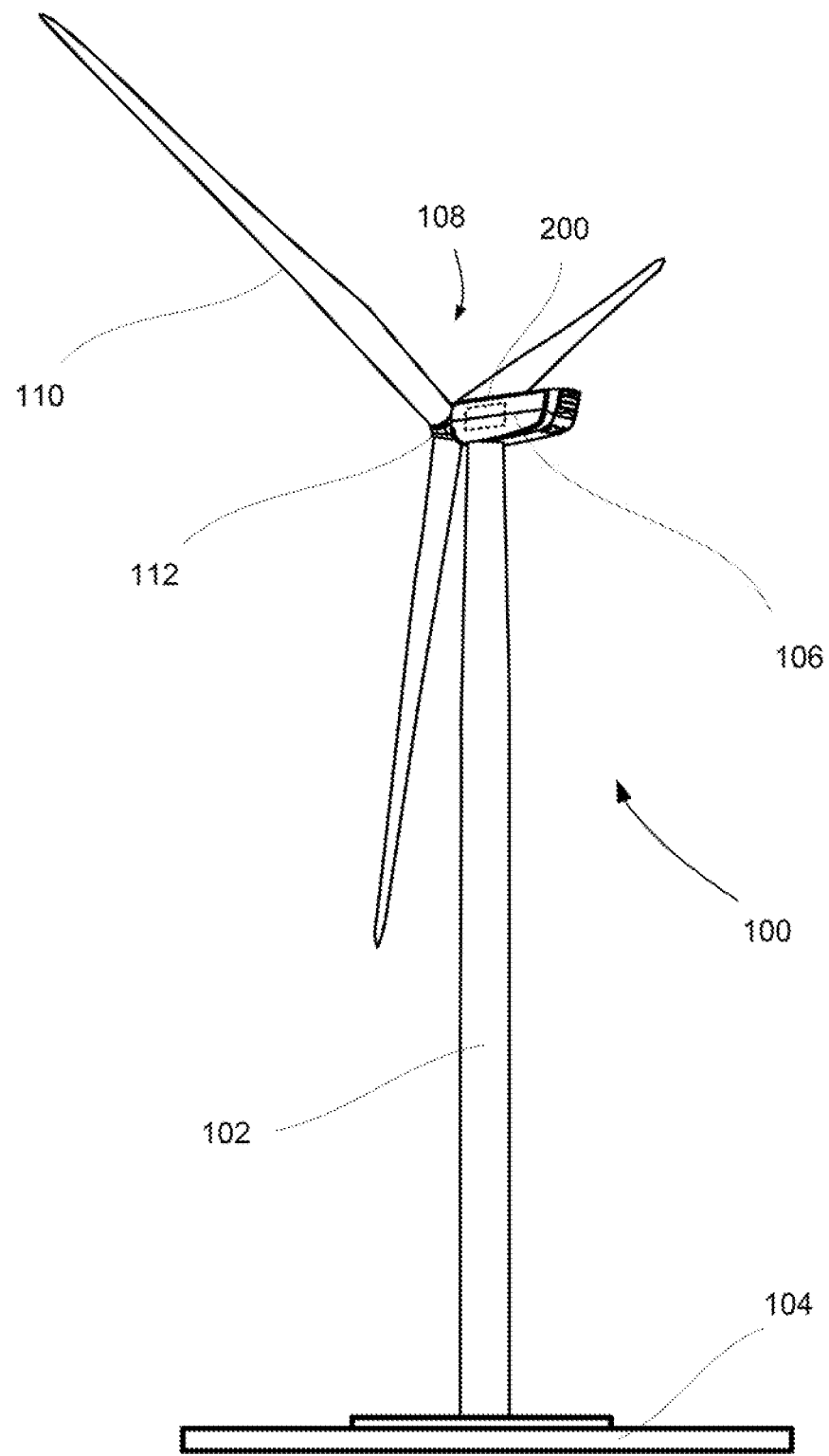
FIG. 1 is a schematic view of a wind turbine according to an embodiment.

As shown in FIG. 1 the wind turbine 100 includes a tower 102. The tower 102 is connected to a foundation 104 fixed on the ground. On a top end of the tower 102 opposite to the foundation 104 a nacelle 106 is arranged. The nacelle 106 houses the drive train. Inside the nacelle 106 for example a generator is arranged which is connected via a drive train including a generator shaft, a gearbox and a rotor shaft with a rotor 108. The rotor 108 includes several rotor blades 110. The rotor blades 110 are mounted on a rotor hub 112. The rotor hub 112 is connected to the rotor shaft.

The rotor 108 is driven in operation by an air flow, for example wind. The rotational movement of the rotor 108 is transmitted via the drive train to the generator. The generator converts the energy of the rotor 108 into electrical energy.

Figure 2:
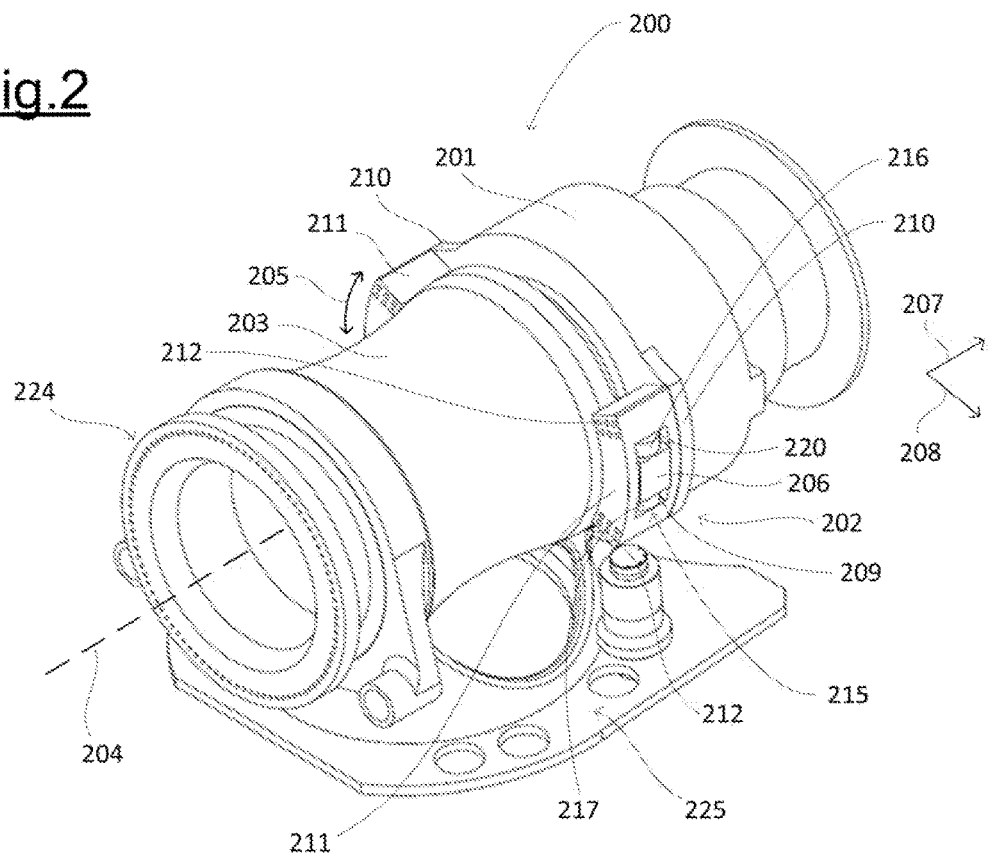
FIG. 2 is a schematic view of a gearbox support arrangement according to an embodiment.

FIG. 2 shows the gearbox support arrangement 200 according to an embodiment.

The gearbox support arrangement 200 includes a rotor bearing support structure 203. The rotor bearing support structure 203 is configured to surround a rotor shaft 224 supported by rotor bearings. The rotor bearing support structure 203 can be configured as one single part which surrounds the rotor shaft 224 and which is supported by a base plate 225 that is part of a yaw system at the top end of the tower 102. According to a further embodiment, the rotor bearing support structure 203 is made out of a plurality of separate parts, one of which is configured to be fixed to a yaw system at the top end of the tower 102.

The gearbox support arrangement 200 includes a gearbox housing 201. The gearbox housing 201 houses gearbox components. The gearbox is configured to transform a drive torque of a rotor shaft coupled with the rotor 108 into an output torque for the generator shaft of the generator of the wind turbine 100.

The gearbox housing 201 and the rotor bearing support structure 203 are arranged one behind the other along a longitudinal axis 204 corresponding to the rotation axis of the rotor shaft 224. The gearbox housing 201 and the rotor bearing support structure 203 are coupled to each other via a torque support arrangement. The torque support arrangement 202 is arranged to transmit a counter torque 205 between the gearbox housing 201 and the rotor bearing support structure 203.

Figure 3:
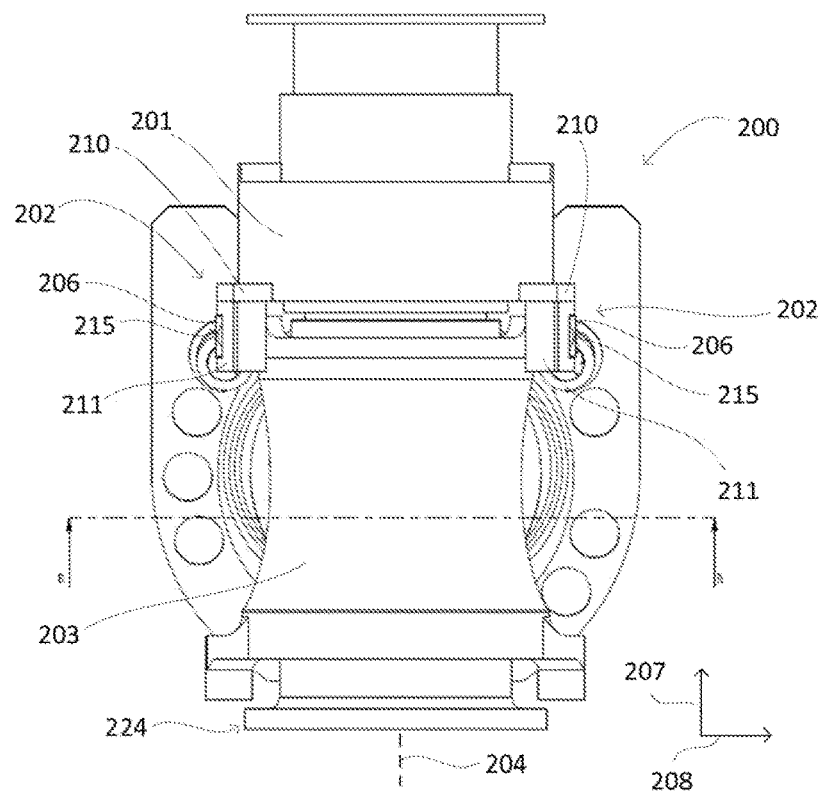
FIG. 3 is a schematic view of a gearbox support arrangement according to an embodiment.
Figure 4:
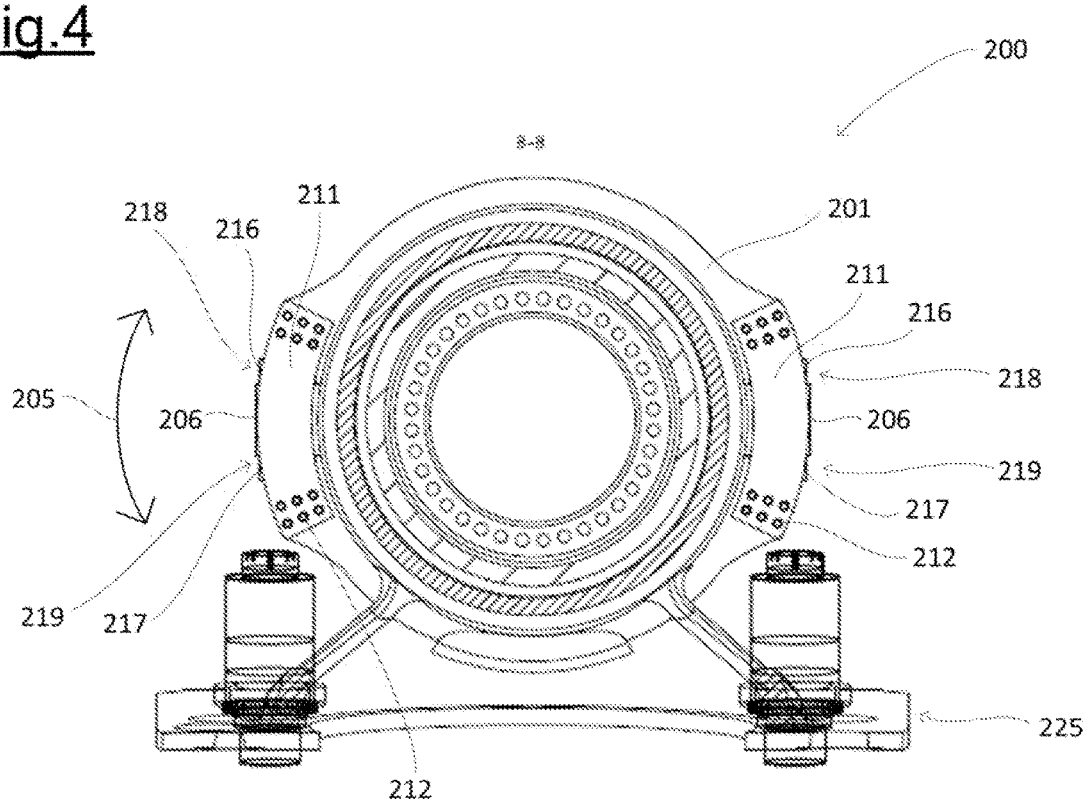
FIG. 4 is a schematic view of the gearbox support arrangement according to the embodiment of FIG. 3.

According to the embodiment shown in FIGS. 2, 3 and 4, the rotor bearing support structure 203 includes two protrusions 206 that protrude along a radial direction 208 from the circumference of the rotor bearing support structure 203. The radial direction 208 is in particular transverse to the axial direction 207.

The protrusions 206, for example, are integrally formed with the rotor bearing support structure 203. As for example shown in FIG. 5, more than two protrusions 206 may be arranged, for example three, four, five, six, seven or more protrusions 206 that protrude radially. The protrusions 206 are formed at an end of the rotor bearing support structure 203 that faces the gearbox housing 201.

A flange 210 is formed at the gearbox housing 201. The flange 210 is arranged at an end of the gearbox housing 201 that faces the rotor bearing support structure 203 along an axial direction 207. The axial direction 207 is for example aligned along the longitudinal axis 204. The flange 210 projects radially to the longitudinal axis 204. The flange 210, for example, is integrally formed with the gearbox housing 201. There are as many flanges 210 as protrusions 206. Alternatively, there may be a single flange 210 around the whole circumference of the gearbox housing 201.

A support frame 211 is fixed to the flange 210. There are as many support frames 211 as protrusions 206. In the shown embodiment, there are two support frames 211. The support frame 211 is axially fixed to the flange 110 by screws 212. The screws are aligned along the axial direction 207. The support frame 211 is pressed against the flange 210 along the axial direction 207 by the screws 212. The screws 212 pass through the support frame 211 along the axial direction 207 to the flange 210.

The support frame 211 surrounds an opening 209. The support frame 211 surrounds the opening 209 with a wall 220. The wall 220 limits the opening 209 in four directions in a plane which is tangential to the circumference of the rotor bearing support structure 203 and the gearbox housing 201. The opening 209 is open along the radial direction 208.

The protrusion 206 and the support frame 211 are mountable along the radial direction 208. For example, the support frame 211 is moved along the radial direction 208 onto the protrusion 206. Thereby, the protrusion 206 is inserted into the opening 209 such that the support frame 211 surrounds the protrusion 206.

A decoupling device 215 is arranged to decouple the gearbox housing 201 and the rotor bearing support structure 203 from each other in a way that reaction loads, vibrations and tilts are not transmitted between the gearbox housing 201 and the rotor bearing support structure 203. The decoupling device 215 is configured to transmit the counter torque 205 between the gearbox housing 201 and the rotor bearing support structure 203.

For example, the decoupling device 215 includes two decoupling elements 216, 217 for each protrusion 206. The decoupling element 216 is arranged at a first side 218 of the protrusion 206. The second decoupling element 217 is arranged at a second opposite side 219 of the protrusion 206. The decoupling elements 216, 217 are arranged tangentially to the circumference of the rotor bearing support structure 203 between the support frame 211 and the protrusion 206. Thus a transmission of the counter torque 205 via the decoupling device 215 is possible.

Figure 6:
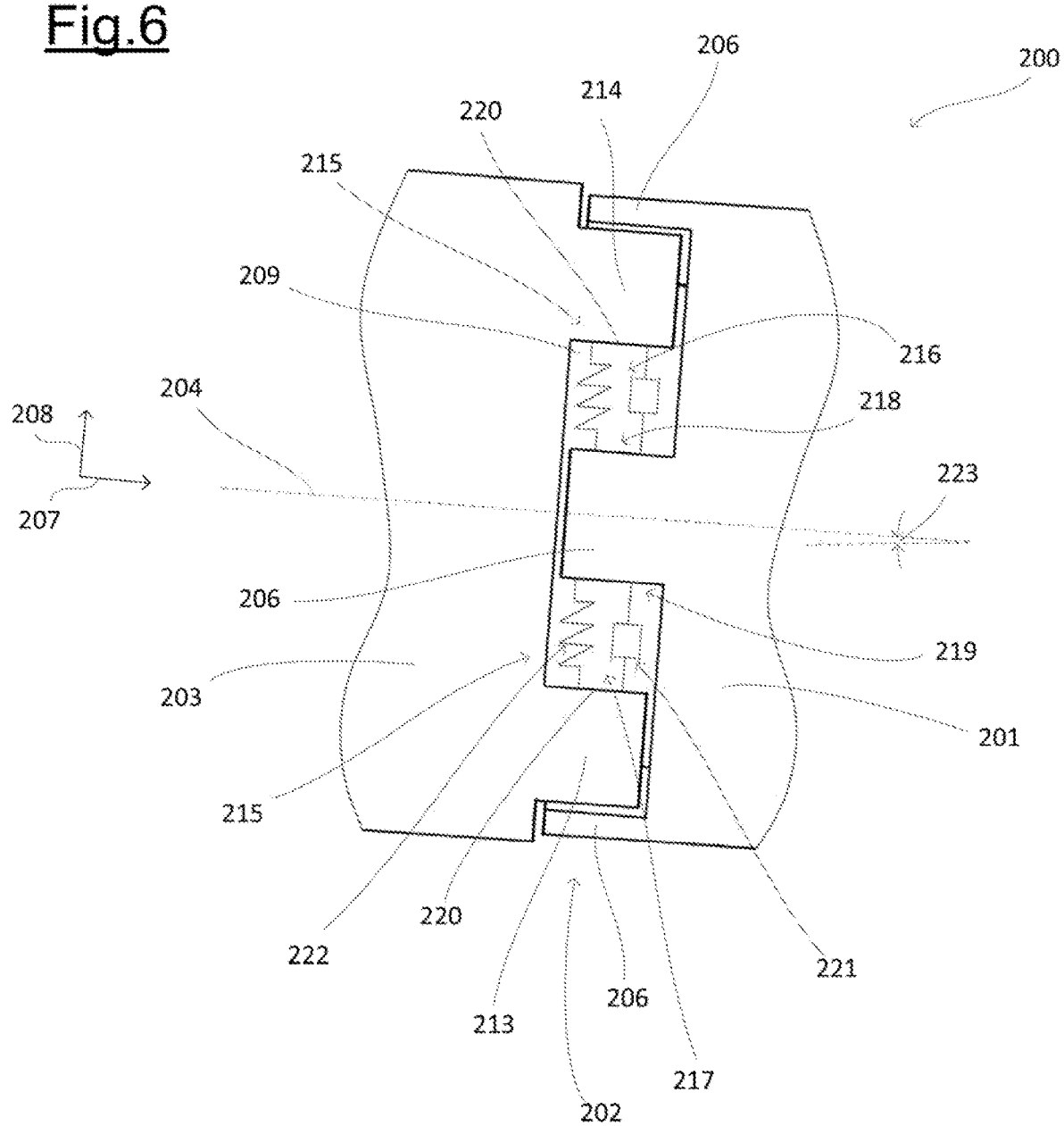
FIG. 6 is a schematic view of a gearbox support arrangement according to an embodiment; and, FIGS. 7 and 8 are schematic views of a gearbox support arrangement according to an embodiment.

For example, the decoupling elements 216, 217 each have a damping function 221 and a spring function 222 (schematically illustrated in FIG. 6). Other realizations of the decoupling elements 216, 217 are possible that allow a transmission of the counter torque 205 and a reduction of reaction loads and vibrations.

According to further embodiments (not explicitly shown) the radial protrusion 206 is arranged at the gearbox housing 201. Accordingly, the flange 210 is arranged at the rotor bearing support structure 203. Apart from that, the torque support arrangement 202 is constructed and works as described above.

It is also possible to have radial protrusions 206 at the rotor bearing support structure 203 as well as at the gearbox housing 201. Accordingly, each corresponding flange 210 is then respectively provided at the other one of the rotor bearing support structure 203 and the gearbox housing 201. Thus, it is possible to have the support frame 211 axially fixed to the rotor bearing support structure 203 and another support frame 211 axially fixed to the gearbox housing 201. This makes a reliable transmission of the counter torque 205 possible.

Figure 5:
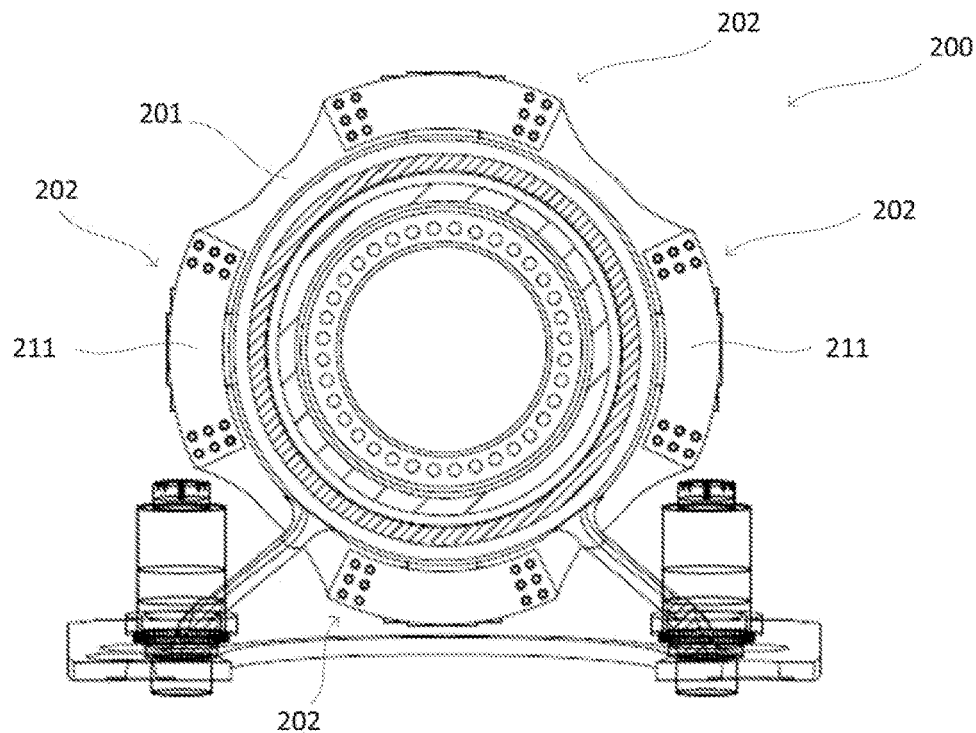
FIG. 5 is a schematic view of the gearbox support arrangement according to an embodiment.

FIG. 5 shows the gearbox support arrangement 200 according to a further embodiment. The embodiment according to FIG. 5 corresponds to the embodiments described above in connection with FIGS. 2 to 4. In addition, the gearbox support arrangement 200 according to the embodiment of FIG. 5 includes more than two protrusions 206 with corresponding support frames 211, in particular four protrusions 206 and corresponding support frames 211, which are arranged symmetrically. According to the embodiment shown in FIG. 5, the protrusions 206 and the support frames 211 all have the same configuration and are arranged in the same way. According to further embodiments, the protrusions 206 are partly arranged on rotor bearing support structure 203 and partly on the gearbox housing 201. For example, the torque support arrangements 202 are arranged in a rotated manner and/or in a mirrored manner with respect to each other.

Of course, other numbers of protrusions 206 and corresponding support frames 211 are possible, for example five protrusions 206 and corresponding support frames 211 that are arranged equally spaced. It is also possible to arrange the protrusions 206 with the corresponding support frames 211 not uniformly but with different spaces towards each other. For example, this allows a more space-saving arrangement and/or a reliable transmission of the counter torque 205.

FIG. 6 shows the gearbox support arrangement 200 according to further embodiments. The gearbox support arrangement 200 corresponds generally with the embodiments of the gearbox support arrangement 200 described above. One of the differences is, however, that the protrusion 206 protrudes along the axial direction 207.

FIG. 6 shows the protrusion 206 at the gearbox housing 201. However, it is also possible that the protrusion 206 is arranged at the rotor bearing support structure 203.

The protrusion 206 protrudes axially into the opening 209. The opening 209 is open at an axial end, such that the protrusion 206 can be inserted into the opening 209 along the axial direction 207. The protrusion 206 and the opening 209 are arrangeable along the axial direction 207. For example, the gearbox housing 201 is moved along the axial direction 207 onto rotor bearing support structure 203. Thereby, the protrusion 206 is inserted into the opening 209.

The opening 209 is formed by two further protrusions 213, 214. The further protrusions 213, 214 limit the opening 209 with the wall 220 along the radial direction 208.

The protrusions 206, 213, 214 of the torque support arrangement 202 allow a coupling of the rotor bearing support structure 203 and the gearbox housing 201 to transmit the counter torque 205 in the way of a claw coupling. In particular the protrusions 206, 213, 214 form a claw coupling. The protrusions 206, 213, 214 each protrude along the axial direction 207 and thereby form U-shaped openings 209. There are also openings 209 between two adjacent protrusions 206. The coupling of the protrusions 206, 213, 214 enables a transmission of the counter torque 205. The axial direction 207 may be inclined by an angle 223 with respect to the horizontal direction.

The decoupling device 215 is arranged between the protrusion 206 and the further protrusion 213 as well as between the protrusion 206 and the further protrusion 214. The decoupling element 216 is arranged at the first side 218 of the protrusion 206. The decoupling element 217 is arranged at the second side 219 of the protrusion 206. The decoupling elements are arranged between all of the protrusions 206, 213, 214.

There may be four protrusions 206 and four further protrusions 213, 214 or more or less protrusions 206 and further protrusions 213, 214. For example, there are two protrusions 206 and one further protrusion 213 and one further protrusion 214. It is also possible to have three, five, six or more protrusions 206 and a corresponding number of further protrusions 213, 214.

Figure 7:
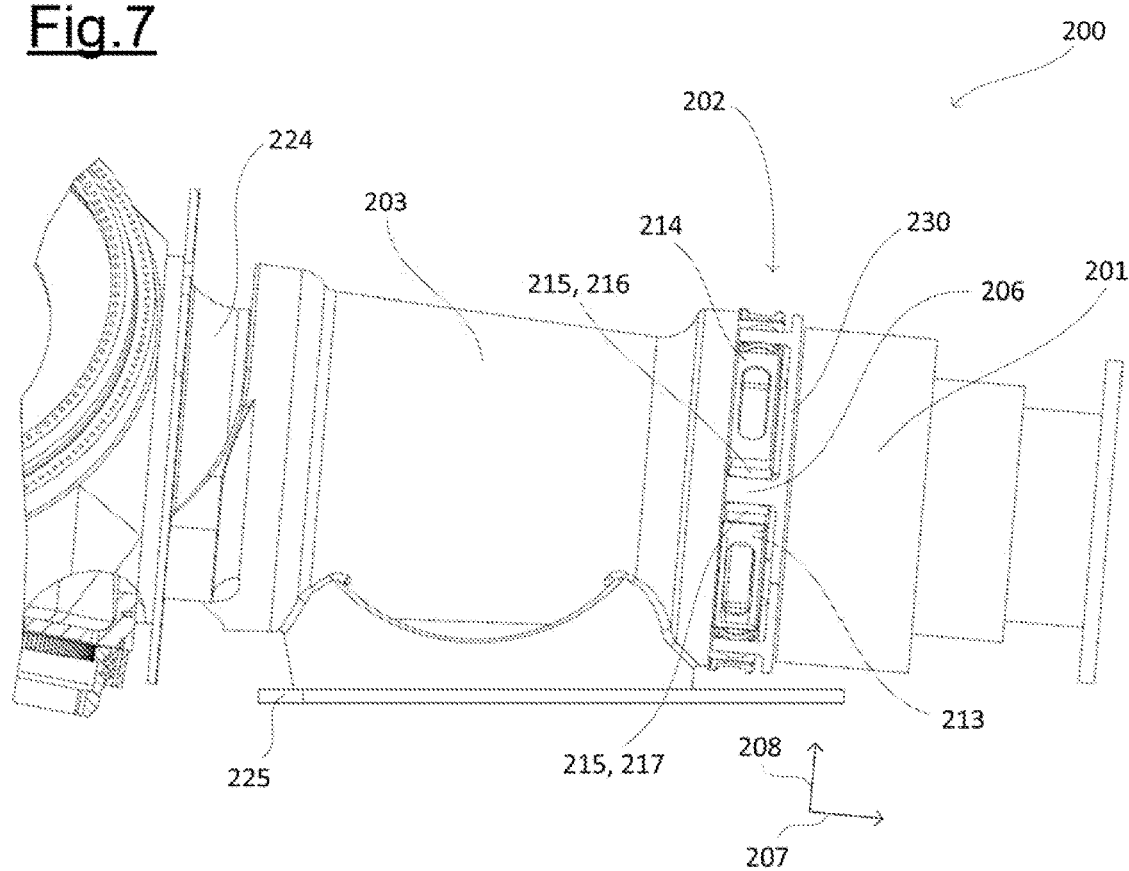
Figure 8:
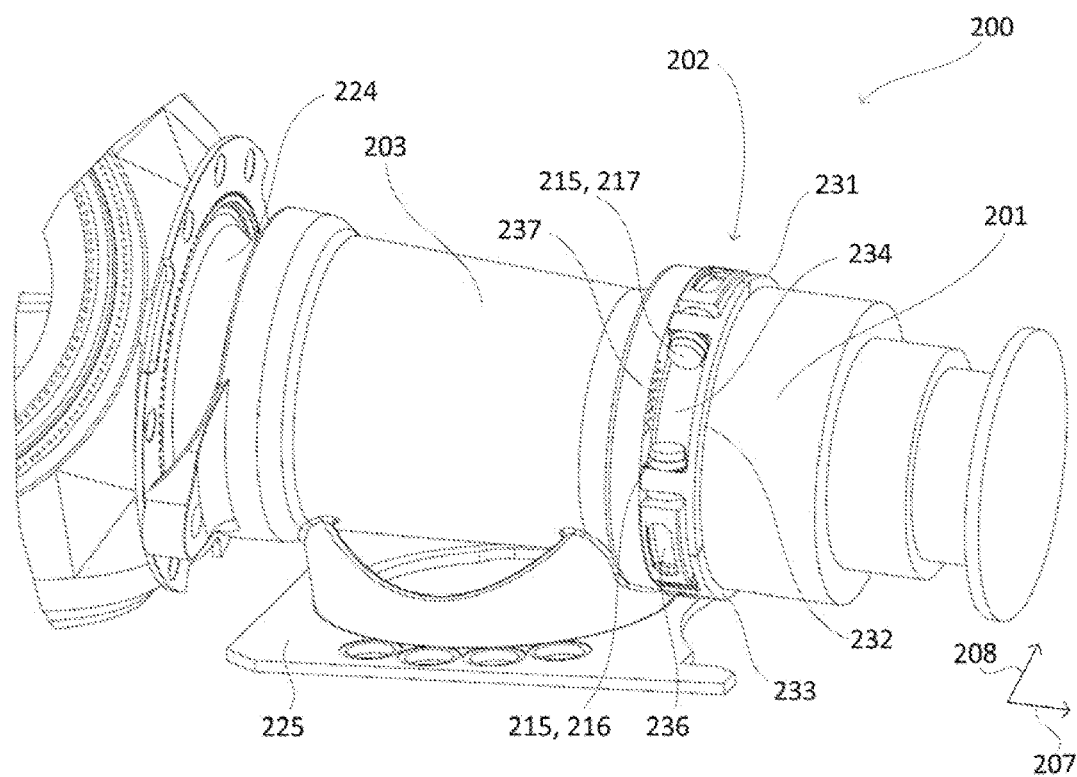

FIGS. 7 and 8 show the gearbox support arrangement 200 according to a further embodiment. The gearbox support arrangement 200 corresponds generally with the embodiments of the gearbox support arrangement 200 shown in FIG. 6. One of the differences is that the protrusion 206 are arranged at a ring element 230. In particular, the ring element 230 includes a plurality of the axial protrusions 206.

The ring element 230 includes a plurality of ring segments 231, 232, 233. For example, the ring element 230 includes three or more ring segments 231, 232, 233. Each ring segment 231, 232, 233 includes one or more protrusions 206.

According to the embodiment shown in FIGS. 7 and 8, the ring segments 231, 232, 233 each are attached to the gearbox housing 201. Each ring segment 231, 232, 233 includes a ring segment bottom surface 234 which protects the inside of the drive train from the environment. In some embodiments, the ring segment bottom surface 234 may also serve as a radial support of the ring segment 231, 232, 233 on the gearbox housing 201 and/or provide a radial support to the further axial protrusions 213, 214.

The protrusions 206 are formed on the ring element 230, which is an element separate to the gearbox housing 201. The ring element 230 is coupled to the gearbox housing 201, such that torque loads can be transmitted between the gearbox housing 201 and the ring element 230.

The further axial protrusions 213, 214 are arranged at the rotor bearing support structure 203. For example, the rotor bearing support structure 203 includes six further protrusions 213, 214, which are screwed to the rotor bearing support structure 203. For this purpose, the rotor bearing support structure 203 for example includes screw holes 237.

For example, the further protrusions 213, 214 are elements separate to the rotor bearing support structure 203. The further protrusions 213, 214 are coupled to the rotor bearing support structure 203, such that torque loads can be transmitted between the further protrusions 213, 214 and rotor bearing support structure 203.

Thus, a transmission of torque loads between the gearbox housing 201 and the rotor bearing support structure 203 is possible via the further protrusions 213, 214 fixed to the rotor bearing support structure 203 and the ring element 230.

The decoupling elements 216, 217 are positioned between the axial protrusions 206 of the ring segments 231, 232, 233 and the further axial protrusions 213, 214.

According to further embodiments (not explicitly shown), the ring segments 231, 232, 233 are attached to the rotor bearing support structure 203. In this embodiment, the gearbox housing 201 includes the corresponding further protrusions 213, 214. Accordingly, the screw holes 237 are arranged at the gearbox housing 201. Apart from that, the elements correspond in particular to what is disclosed herein.

According to the embodiment according to FIGS. 7 and 8, the ring segments 231, 232, 233 are radially removable without the need of dismantling the rotor bearing support structure 203 and/or the gearbox housing 201. This enables an easy access to the inside of the gearbox support arrangement 200, for example to conduct assembly work and/or maintenance work. This may include for example tightening screws located inside the rotor bearing support structure 203 and/or the gearbox housing 201.

According to embodiments, the bottom surface 234 of the ring segments 231, 232, 232 may include an opening (not explicitly shown). The opening is radially aligned with an opening 236 of the further protrusion 213, 214 located over the ring segment bottom surface 234 in the radial direction 208. A technician located next to the torque support arrangement 202 can thus have a look at the inside of the drive train through the radially aligned ring segment openings and the openings 236. For example, the segment opening includes a triangular shape.

According to embodiments, the ring segment opening is formed at a butt joint between two directly adjacent ring segments 231, 232, 233.

According to embodiments, at least one of the ring segment opening and the openings 236 is covered by a transparent cover for protecting the inside of the drive train from the environment.

According to embodiments the gearbox support arrangement 200 includes one or more torque support arrangements 202 as described in connection with FIGS. 2 to 5 in combination with one or more torque support arrangements 202 as described in connection with FIGS. 6 to 8. Thus, one or both of the rotor bearing support structure 203 and the gearbox housing 201 for example includes radial and axial protruding protrusions 206. For example, one of the rotor bearing support structure 203 and the gearbox housing 201 includes radial protrusions 206 and the other one includes axial protruding protrusion 206.

The combination of the embodiments of the torque support arrangement 202 makes it possible to reduce constraining forces and to compensate displacements caused by tolerances and static deformation of the components.

The gearbox support arrangement 200 with the torque support arrangement 202 according to the different embodiments allows a coupling of the rotor bearing support structure 203 with the gearbox housing 201 with connecting means parallel to the longitudinal axis 204. The opening 209, that acts as the counterpart for the protrusion 206 can be fixed directly to the rotor bearing support structure 203 or the gearbox housing 201 respectively. The counter torque is transmitted via the decoupling device 215. The gearbox support arrangement 200 with the torque support arrangement 202 makes a short tolerance chain possible. Also, a coupling of the gearbox housing 201 for transmitting torques in both directions is possible with the same structural component, namely the torque support arrangement 202. Vertical forces to the base or machine frame can be avoided. Thus, a bending of the base or machine frame can be avoided. There is no need to arrange torque support elements such as torque arms on the base or machine frame. Thus, the space requirement and the high masses can be avoided.

The coupling of the gearbox housing 201 with the rotor bearing support structure 203 can be simplified. This makes a cost-effective gearbox support arrangement 200, which has lower masses, possible. A simplified rotor bearing support structure 203 is possible. For example, the torque support arrangement 202 is useful for drive drains with two tapered roller bearings which take over the function of the rotor bearings and are arranged in the rotor bearing support structure 203. More than two torque support arrangements 202 are possible such that the counter torque that is to be transmitted is distributed over several coupling points.

Further, stiffening elements are possible, for example for further protrusions 213, 214 that limit the opening 209. For example, stiffening elements are bolted to the further protrusions 213, 214 to reinforce the further protrusions 213, 214.

For example, the torque support arrangement 202 transmits only the counter torque 205 from the gearbox drive torque and the weight of the gearbox relieves the rotor bearing support structure 203, in particular in case of a radially and angularly fixed connection between the rotor shaft and the gearbox input shaft.

The torque support arrangement 202 makes it possible to install the rotor 108 first and afterwards the gearbox is installed and aligned. The torque support arrangement 202 realizes an interface that is not highly integrated and complex. Modularity of the gearbox support arrangement 200 is therefore achievable. By adjusting the stiffness and the damping properties of the decoupling device 215, it is possible to adapt and react to properties of the wind turbine 100, for example, tonality problems, after erection of the wind turbine. Overall, the torque support arrangement 202 makes a relatively cost-efficient, lightweight and simple torque loads transmission between the gearbox housing 201 and the rotor bearing support structure 203 possible.

It is understood that the foregoing description is that of the preferred embodiments of the invention and that various changes and modifications may be made thereto without departing from the spirit and scope of the invention as defined in the appended claims.

REFERENCES 100 wind turbine
102 tower
104 foundation
106 nacelle
108 rotor
110 rotor blade
112 rotor hub
200 gearbox support arrangement
201 gearbox housing
202 torque support arrangement
203 rotor bearing support structure
204 longitudinal axis
205 counter torque
206 protrusion
207 axial direction
208 radial direction
209 opening
210 flange
211 support frame
212 screws
213, 214 further protrusions
215 decoupling device
216, 217 decoupling element
218, 219 sides of the protrusion
220 wall
221 damping function
222 spring function
223 tilt angle
224 rotor shaft
225 base plate
230 ring element
231, 232, 233 ring segment
234 ring segment bottom surface
236 further protrusion opening
237 screw holes

What is claimed is:

1. A gearbox support arrangement for a wind turbine, the gearbox support arrangement comprising:
a gearbox housing including two protrusions;
a torque support arrangement;
a rotor bearing support structure including two further protrusions;
said gearbox housing and said rotor bearing support structure being arranged next to each other along a longitudinal axis such that said two protrusions and said two further protrusions interlock, such that said two protrusions and said two further protrusions are arranged so that one of said two protrusions is arranged between said two further protrusions and one of said two further protrusions is arranged between said two protrusions;
wherein said torque support arrangement couples said gearbox housing and said rotor bearing support structure with each other such that torque loads are transmittable between said gearbox housing and said rotor bearing support structure; and,
said torque support arrangement including a decoupling device configured to transmit the torque loads between said gearbox housing and said rotor bearing support structure and to reduce a transmission of vibrations and reaction loads between said gearbox housing and said rotor bearing support structure.

2. The gearbox support arrangement of claim 1, wherein:
said two protrusions protrude along an axial direction; and,
said one of said two protrusions protrudes between said two further protrusions along the axial direction.

3. The gearbox support arrangement of claim 2, wherein said torque support arrangement defines an opening at the other one of said rotor bearing support structure and said gearbox housing; said decoupling device includes two decoupling elements which are tangentially arranged on opposite sides of said two protrusions; each of said two decoupling elements is arranged between said two protrusions and a wall; and, said wall is part of one of said two further protrusions and limits said opening.

4. The gearbox support arrangement of claim 3, wherein each of said two decoupling elements includes a spring damping element; and, said spring damping element has a hydraulic, elastomeric, elastomeric-hydraulic or plastic structure.

5. The gearbox support arrangement of claim 2, wherein said torque support arrangement includes a ring element; said ring element is formed separately from said gearbox housing and said rotor bearing support structure; and, said ring element is connected to said gearbox housing and includes said two protrusions or is connected to the rotor bearing support structure and includes said two further protrusions.

6. The gearbox support arrangement of claim 5, wherein said ring element includes a plurality of ring segments; and, said ring segments each are radially removable from a corresponding one of said gearbox housing and said rotor bearing support structure.

7. The gearbox support arrangement of claim 2, wherein said two further protrusions are formed separately from said gearbox housing and said rotor bearing support structure; and, said two further protrusions are connected to said rotor bearing support structure.

8. The gearbox support arrangement of claim 1, wherein the gearbox support arrangement comprises a plurality of said torque support arrangements arranged around a circumference of said rotor bearing support structure and said gearbox housing.

9. The gearbox support arrangement of claim 8, wherein said plurality of torque support arrangements are symmetrically arranged.

10. The gearbox support arrangement of claim 1, wherein said two protrusions and said two further protrusions each protrude along an axial direction and form U-shaped openings.

11. The gearbox support arrangement of claim 1, wherein decoupling elements are arranged between all of said two protrusions and said two further protrusions.

12. A wind turbine comprising:
a nacelle;
a gearbox support arrangement arranged within the nacelle;
said gearbox support arrangement including a gearbox housing having two protrusions, a torque support arrangement, and a rotor bearing support structure including two further protrusions;

said gearbox housing and said rotor bearing support structure being arranged next to each other along a longitudinal axis such that said two protrusions and said two further protrusions interlock, such that said two protrusions and said two further protrusions are arranged alternately so that one of said two protrusions is arranged between said two further protrusions and one of said two further protrusions is arranged between said two protrusions;

wherein said torque support arrangement couples said gearbox housing and said rotor bearing support structure with each other such that torque loads are transmittable between said gearbox housing and said rotor bearing support structure; and, said torque support arrangement including a decoupling device configured to transmit the torque loads between said gearbox housing and said rotor bearing support structure and to reduce a transmission of vibrations and reaction loads between said gearbox housing and said rotor bearing support structure.

* * * * *